United States Patent
Englert

(10) Patent No.: US 9,016,913 B2
(45) Date of Patent: Apr. 28, 2015

(54) ILLUMINATED COMPONENT

(75) Inventor: Thomas Englert, Wagen (CH)

(73) Assignee: WEIDPLAS GmbH, Rapperswil (CH)

( * ) Notice: Subject to any disclaimer, the term of this patent is extended or adjusted under 35 U.S.C. 154(b) by 276 days.

(21) Appl. No.: 13/580,764

(22) PCT Filed: Feb. 10, 2011

(86) PCT No.: PCT/CH2011/000024
§ 371 (c)(1),
(2), (4) Date: Aug. 23, 2012

(87) PCT Pub. No.: WO2011/103692
PCT Pub. Date: Sep. 1, 2011

(65) Prior Publication Data
US 2012/0320615 A1 Dec. 20, 2012

(30) Foreign Application Priority Data

Feb. 25, 2010 (CH) ........................................ 0232/10

(51) Int. Cl.
| | | |
|---|---|---|
| *B60Q 1/32* | (2006.01) | |
| *G09F 13/04* | (2006.01) | |
| *B60R 13/02* | (2006.01) | |
| *F21W 121/00* | (2006.01) | |
| *F21Y 105/00* | (2006.01) | |
| *G09F 13/22* | (2006.01) | |
| *F21Y 101/02* | (2006.01) | |

(52) U.S. Cl.
CPC .............. *B60Q 1/323* (2013.01); *G09F 13/04* (2013.01); *B60Q 2500/10* (2013.01); *B60R 13/02* (2013.01); *F21W 2121/00* (2013.01); *F21Y 2105/00* (2013.01); *F21Y 2105/001* (2013.01); *G09F 2013/222* (2013.01); *F21Y 2101/02* (2013.01)

(58) Field of Classification Search
CPC ...... B60Q 1/323; B60Q 2500/10; G01F 13/04
USPC ................................................ 362/511, 23.05
See application file for complete search history.

(56) References Cited

U.S. PATENT DOCUMENTS 5,568,367 A * 10/1996 Park ................................ 362/109
7,287,892 B1 10/2007 Pang et al.

FOREIGN PATENT DOCUMENTS

| DE | 3006457 A1 | 8/1981 |
|---|---|---|
| DE | 40 06 649 C1 | 8/1991 |
| DE | 44 21 942 A1 | 1/1996 |
| DE | 10102774 A1 | 8/2002 |

(Continued)

OTHER PUBLICATIONS

International Search Report for PCT/CH2011/000024 dated May 16, 2011.

*Primary Examiner* — David V Bruce
(74) *Attorney, Agent, or Firm* — Sughrue Mion, PLLC

(57) ABSTRACT

An illuminable component having a two-dimensionally extending decorative element which has at least one translucent region and at least one non-translucent region. A lighting source serves to illuminate the at least one translucent region. A light-filtering layer is arranged between the decorative element and the lighting source, the layer being integrally attached to a rear side of the decorative element by injection molding. A structure is provided that completely absorbs and/or scatters light when the lighting source is transported to the specified edge. As a result, leakage light at an edge of the component can be reliably avoided.

17 Claims, 2 Drawing Sheets

(56) References Cited

FOREIGN PATENT DOCUMENTS

Figure 1:
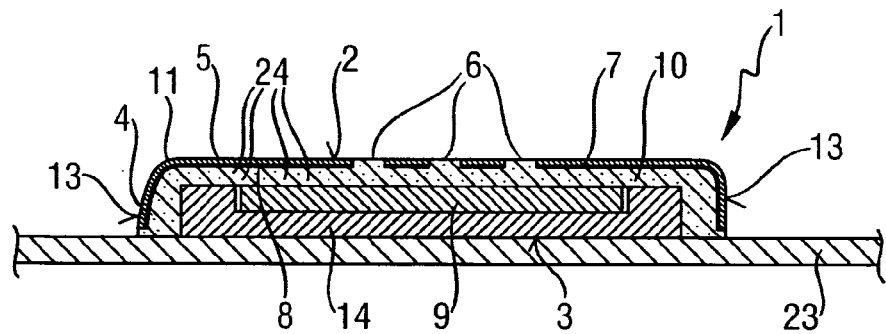

| DE | 103 22 187 | A1 | | 12/2003 |
|---|---|---|---|---|
| DE | 202004008681 | U1 | | 8/2004 |
| DE | 103 32 975 | A1 | | 2/2005 |
| DE | 10332975 | A1 | * | 2/2005 |
| EP | 0 703 051 | A1 | | 3/1996 |
| EP | 2028046 | A1 | | 2/2009 |
| WO | 98/49700 | A1 | | 11/1998 |
| WO | 2009/075924 | A1 | | 6/2009 |

* cited by examiner

ILLUMINATED COMPONENT

CROSS REFERENCE TO RELATED APPLICATIONS

This application is a National Stage of International Application No. PCT/CH2011/000,024 filed Feb. 10, 2011, claiming priority based on Swiss Patent Application No. 0232/10 filed Feb. 25, 2010, the contents of all of which are incorporated herein by reference in their entirety.

The invention relates to an illuminable component having a visible face, an edge surrounding the visible face and a rear face, comprising a two-dimensionally extending decorative element having at least one translucent region and at least one non-translucent region, an illuminating element for illuminating the at least one translucent region and at least one light-guiding layer arranged between the decorative element and the illuminating element, said layer being attached to a rear face of the decorative element.

Such components are, for example, provided as door sill strips for vehicles. They may be attached at a corresponding point on the vehicle bodywork, for example by latching means. On the upper face and/or visible face of the component, the translucent region forms, for example, a printed text or/and a symbol. An illuminating element, for example a luminous film, LEDs or the like are arranged inside the component, said illuminating element illuminating the translucent region through the transparent light-guiding layer. The two-dimensionally extending decorative element in this case is, for example, a metal sheet which has been shaped in an injection-moulding tool by being injection-moulded from the rear with the light-guiding layer. This layer preferably surrounds the entire rear face of the decorative element.

In such a component, therefore, there is the problem that in the mounted state leakage light may emerge from the edge through a gap which in many cases is barely avoidable, which is generally not desirable. Such leakage light could per se be avoided in a simple manner, by a frame consisting of non-translucent plastics material being injected onto the light-guiding layer. Thus, for example, DE-C-40 06 649 discloses a switch cover in which a transparent plastics material is injection-moulded onto a two-dimensionally extending decorative element. In order to avoid the undesirable escape of light, a cover body made of non-translucent plastics material is additionally injection-moulded onto the decorative element. Said plastics material surrounds the transparent plastics material in the shape of a frame. EP-A-0 703 051 discloses a component for producing a pushbutton. A transparent light guide panel is injection-moulded onto the rear face of a decorative element. Said light guide panel is surrounded by a non-translucent frame which is injection-moulded onto the decorative element and the light guide panel. WO 98/49700 discloses a cover part which comprises a transparent insert around which a non-transparent material is injection-moulded.

The aforementioned components are generally mass-produced parts which have to be produced in very high quantities. Requirements are set for such components that they are able to be produced cost-effectively and thus are functionally reliable and meet high aesthetic standards. It is essential, in particular, that the visible face has an attractive surface and leakage light is able to be avoided, in particular, on the edge of the component.

The object of the invention is to provide a component of the aforementioned type in which leakage light may be substantially avoided and which nevertheless may be produced cost-effectively.

The object is achieved in a generic component by an element being provided which substantially completely absorbs and/or scatters light when conveyed by the illuminating element through the at least one light-guiding layer to the aforementioned edge. Such an element may, for example, have a pigment which is incorporated, for example, in the light-guiding layer and/or in an adhesive layer and/or in a further layer. In this case, use is made of the fact that the path of the light from the illuminating element to the translucent region is substantially shorter than the path to a possible leakage point on the edge of the component. The light may be substantially completely absorbed and/or scattered, for example, by such a pigment on the relatively long path to the possible leakage point. As a result of the scattering, leakage light may be substantially entirely avoided. The light-absorbing and/or scattering element may also be present only in a partial region of the light-guiding layer and/or in the further layer and/or the adhesive layer and/or in the decorative element. In the component according to the invention, therefore, leakage points are potentially able to be larger than in known components. The invention permits, therefore, in particular the production of components with greater production tolerances, as light is substantially absorbed and/or scattered in the component before reaching the possible leakage point and thus troublesome leakage light may be avoided. Substantially complete absorption and/or scattering is present, therefore, when the light intensity has been reduced by 90%, the light intensity at the leakage point being at most still 10% of the light intensity present in the illuminated region, measured in $cd/m^2$. Preferably, however, the reduction is greater and is preferably 99%. In this case, if the light intensity in the illuminated region is $100\,cd/m^2$ (Candela) at the leakage point it is at most $10\,cd/m^2$ and preferably at most $1\,cd/m^2$.

According to a development of the invention, the adhesive layer is on the rear face of the decorative element. The adhesive layer and/or the further layer is, for example, an adhesion agent, an adhesive or lacquer. Said adhesive layer permits a fixed connection of the injection-moulded light-guiding layer to the decorative element. The decorative element may, therefore, be completely injection-moulded to the rear with the light-guiding layer. The light-guiding layer thus shapes the two-dimensionally extending decorative element during the injection-moulding process. As the decorative element is only injection-moulded to the rear with the at least one light-guiding layer, it is possible to ensure an exact shaping and thus an external face and/or visible face of the decorative element which has the desired shape. The light-guiding layer and the decorative element may thus be very easily and thus accurately produced as a unit. This unit may then be joined to the illuminating element and optionally a housing. The component produced in this manner may be used for producing, for example, a sill strip, a decorative strip, an operating element or a pushbutton. The decorative element is, for example, an element for a motor vehicle, for example a sill strip, central console, roof console, door, door lining, or even a display inside the motor vehicle. A configuration of the decorative element as a switch or even merely as a switch button is also conceivable. Applications of the invention for illuminated elements are also conceivable, for example for domestic appliances, for example refrigerators, steamers, washing machines, ovens, cookers, dishwashers or items of furniture and the like.

According to a development of the invention, it is provided that the two-dimensionally extending decorative element extends at least partially over the aforementioned edge. The light-guiding layer in this case is preferably also configured so that it extends at least as far as the edge. Preferably, this edge is peripheral. Thus a particularly robust and yet aesthetically attractive component may be produced.

The light-absorbing and/or light-scattering element according to a development is arranged in the light-guiding layer. Said element, for example and in particular, comprises a pigment which is present homogenously or non-homogenously in an injection-moulded layer. In particular, titanium dioxide or cobalt blue or carbon black are suitable as pigments. According to an alternative embodiment it is provided that the light-absorbing and/or light-scattering element is arranged in the adhesive layer and/or the further layer on the rear face of the decorative element. The adhesive layer and/or the further layer may be arranged on a rear face of the decorative element and/or on a further element of the component adjacent to the light-guiding layer, such as for example the surface of a housing, and/or the material from which such a component consists, comprises the light-absorbing and/or light-scattering element. The adhesive layer may, for example, be formed by an adhesion agent (for example black coloured heat sealing enamel), for example an adhesive (for example black coloured epoxy-based or polyurethane-based adhesive) or, for example, by a lacquer (for example black coloured polyester lacquer). The aforementioned further layer is, for example, a film (for example a black polyethylene film), for example galvanized black chrome plating or a layer consisting of titanium carbon nitride or titanium oxynitride.

The light-absorbing and/or light-scattering element may be present in the light-guiding layer and/or in the adhesive layer and/or in the further layer and/or in the decorative element of the component.

In principle, the rear face of the two-dimensionally extending decorative element may also be configured to be light-absorbing. An adhesive layer and/or a further layer and/or a decorative element with light-absorbing and/or light-scattering element and/or light-absorbing and/or light-scattering element in the light-conducting layer are thus not imperative. For example, the rear face of the decorative element may be configured to be light-absorbing by chemical modification, such as for example nitrating, and thus the incorporation of nitrogen.

According to a development of the invention, it is provided that between the decorative element and the light-guiding layer a transparent film is arranged which extends at least over the translucent region of the decorative element. Said transparent film is preferably free from any light-absorbing and/or light-scattering element. Thus it is achieved that a particularly large amount of light passes from the illuminating element to the illuminated region. The transparent film is preferably injection-moulded from the rear by the light-guiding layer and preferably engages at least partially in at least one opening of the decorative element.

According to a development of the invention, it is provided that the component comprises a housing with which it may be fastened to an object, for example a vehicle body or the like. The fastening takes place, for example, by latching means or the like. The housing is preferably also configured so that it is able to receive the illuminating element. Preferably, the housing is configured so that it shields the illuminating element so that the light is not able to escape to the rear and to the side. Preferably, the regions of the housing which are adjacent to the light-guiding layer have at least partially, preferably entirely, an adhesive layer and/or a further layer with a light-absorbing and/or light-scattering element, and/or the material from which the housing consists, comprises a light-absorbing and/or light-scattering element.

A particularly decorative component may be produced according to a development if the decorative element is produced from metal. Preferably, the decorative element is a film or a sheet, for example a metal film or a metal sheet, in particular a steel film or steel sheet, a light metal film or a light metal sheet.

Figure 2:
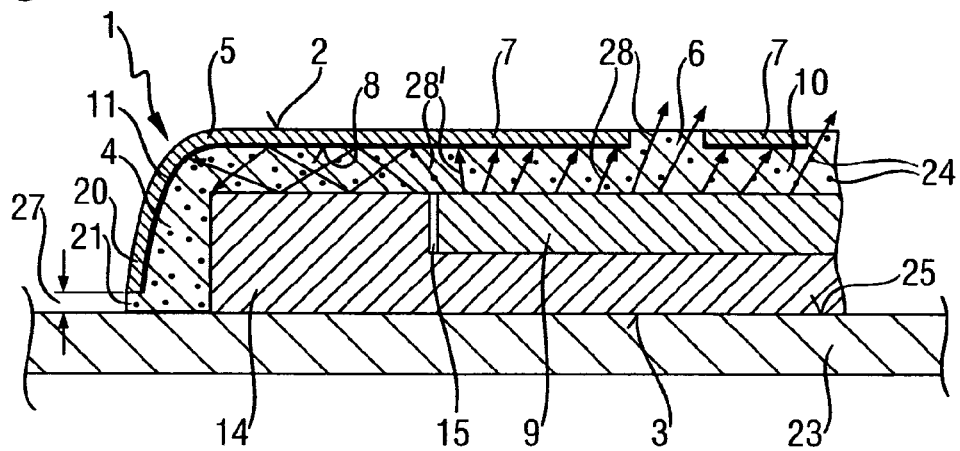
Figure 3:
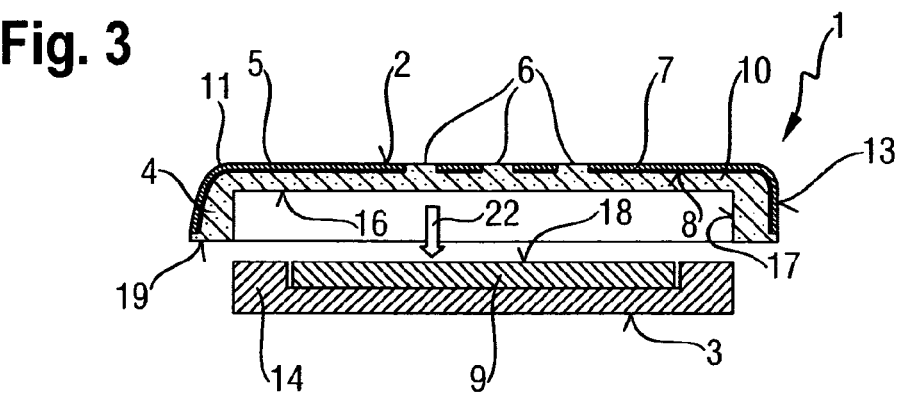
Figure 4:
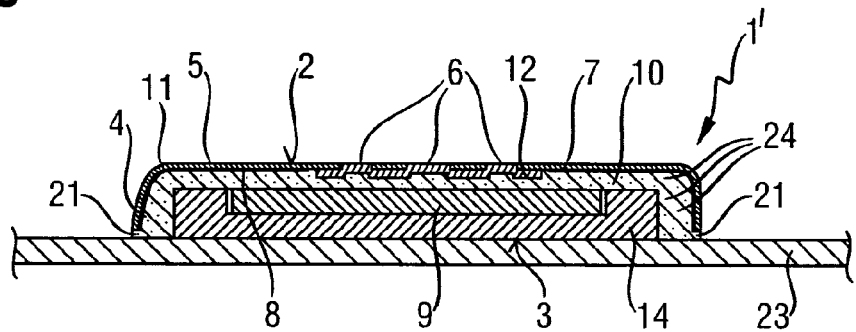
Figure 5:
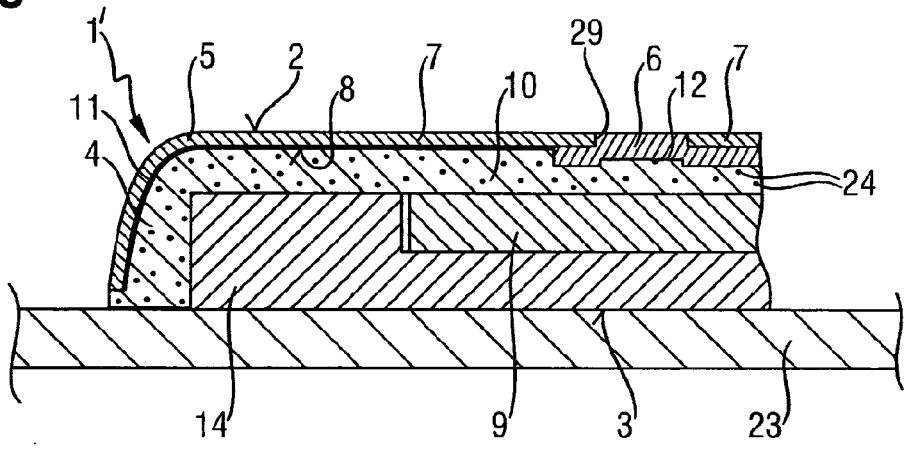
Figure 6:
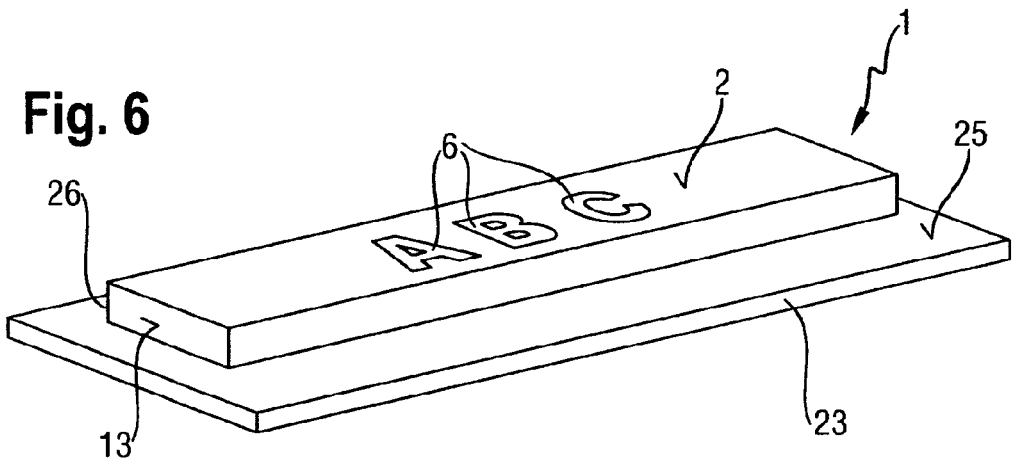

Exemplary embodiments of the invention are explained hereinafter in more detail with reference to the drawings, in which:

FIG. 1 shows schematically a section through a component according to the invention which is mounted on a part which is also in section, FIG. 2 shows an enlarged partial section according to FIG. 1, FIG. 3 shows a section according to FIG. 1, the two-dimensionally extending decorative element being lifted away with the light-guiding layer injection-moulded to the rear, FIG. 4 shows schematically a section through a mounted component according to the invention according to a variant, FIG. 5 shows schematically an enlarged partial section according to FIG. 4 and FIG. 6 shows schematically a three-dimensional view of a mounted component according to the invention.

The component 1 shown in FIGS. 1 and 2 is fastened to a rear face 3 on a part 23, for example a vehicle body. The component 1 may, for example, be bonded to an upper face 25 of the part 23 or even mechanically fastened, for example, by latching means, not shown here. Said latching means may, for example, be arranged on the lower face 3 of a housing 14. The component 1 is, for example, a sill strip, a decorative strip, an operating element, for example provided for a fitting or for producing a pushbutton. Said component has a front face 2 which forms at least partially a visible face, an edge 4 surrounding the front face 2, said edge having an outer face 13. The edge 4 and the outer face 13 are preferably peripheral, which however is not imperative. The front face 2 may be two-dimensionally extending. However, also possible is an embodiment with an uneven front face which, for example, has grooves and/or ribs.

The front face 2 and preferably also the outer face 13 of the edge 4 is and/or are formed by a two-dimensionally extending decorative element 5. Said decorative element is, as may be seen, drawn to the side over the edge 4 and extends substantially as far as the upper face 25 of the part 23. In principle, an embodiment is also conceivable in which the decorative element has been drawn to the side but not downwards. As in particular FIG. 2 shows, a gap 21 is present between a peripheral edge 20 of the two-dimensionally extending decorative element 5 and the upper face 25. Said gap is generally very small, for example preferably 0.1 to 0.2 mm wide. Preferably the gap 21 is 0.05 to 1 mm and even more preferably 0.05 to 5 mm wide. The distance between the edge 20 and the upper face 25 in FIG. 2 is indicated by the double arrow 27. Such a gap 21 may also be produced by unevenness of the part 23 on the upper face 25.

The decorative element 5 has a translucent region 6 which may be illuminated and a non-translucent region 7. The region 6 may according to FIG. 6, for example, represent letters. However, in this case other, for example pictorial, symbols are also possible. The region 6 is, for example, formed by stamped-out portions of the decorative element 5. Outside the region 6, the decorative element 5 is not permeable to light. This is the case, for example, when the decorative element 5 is produced from metal, for example from a steel sheet or light metal sheet. In principle, however, the decorative element 5 could also be produced from a non-translucent plastics material. The decorative element 5 may also be multi-layered.

The decorative element 5 has a rear face 8 to which an adhesive layer 11 is attached. Said adhesive layer 11 serves, in particular, to connect an injection-moulded light-guiding layer 10 fixedly to the decorative element 5. The adhesive layer 11 may, for example, be an adhesion agent, an adhesive or a lacquer. Said adhesion agent, adhesive or lacquer are preferably coloured black. Alternatively, the rear face 8 may be chemically treated. The rear face 8 may, for example, be made absorbent by nitriting. Also possible is the application of a galvanized black chrome layer, a black polyethylene film or a layer of titanium carbon nitride or titanium oxynitride. The decorative element 5 is injection-moulded from the rear with the light-guiding layer 10. When the decorative element 5 is injection-moulded from the rear with the light-guiding layer 10 the decorative element 5 is correspondingly shaped in the injection-moulding tool. At the same time, the light-guiding layer 10 is connected to the decorative layer 5. As is visible, the light-guiding layer extends over the entire rear face 8 of the decorative element 5. It forms the translucent region 6 and also the edge 4, as well as according to FIG. 3 a peripheral front face 19. It additionally forms according to FIG. 3 a rear recess 17 with a preferably two-dimensionally extending inner face 16. Said recess 17 serves for receiving an illuminating element 9 which are mounted in a housing 14. The illuminating element 9 has, for example, a light-conducting layer into which light is radiated by LEDs, not shown here. The illuminating element 9 may, however, for example also have a luminous film.

The light emitted by the illuminating element 9 passes through the light-guiding layer 10 to the translucent region 6 and exits said region as is indicated in FIG. 2 by light rays 28. Part of the light which is emitted by the illuminating element 9, however, does not emerge at the translucent region 6 but is radiated according to the indicated rays 28' to the side into the light-guiding layer 10. This light could, in principle, pass by means of reflection as far as the gap 21 which, as a result, would form a leakage point. In order to prevent this, the light-guiding layer 10 contains an element 24 which absorbs and/or scatters this light. The action of the absorption and/or scattering is adjusted such that substantially no light is able to reach the gap 21, thus the light on the path to this gap 21 is substantially completely absorbed and/or scattered. The absorption element and/or scattering element 24 is, for example, formed by a pigment, which is distributed homogenously or non-homogenously in the light-guiding layer 10. The absorption element 24 may, in principle, also be present in the translucent region 6. The path which the light passes through from the illuminating element 9 to the front face 2 is relatively short, so that in this case the corresponding absorption and/or scattering may be disregarded. As may be seen, the path from the illuminating element 9 to the gap 21 is much longer than from the illuminating element 9 to the outer face 2.

Additionally, leakage light would have to alter direction by approximately 90° in the region of an edge 26.

Alternatively or additionally to the absorption element and/or scattering element 24 in the light-guiding layer, the adhesive layer 11 may be provided with such an absorption element and/or scattering element. The housing 14 may also be provided with an absorption element. It is essential, therefore, that light not emerging from the translucent region 6 is substantially completely absorbed and/or scattered on the path to the gap 21.

FIGS. 4 and 5 show a component 1' which substantially corresponds to the component 1, but additionally has a film 12 made of a translucent plastics material. This film 12 is injection-moulded from the rear by the light-guiding layer 10 and engages in openings 29 of the decorative element 5. Said openings 29 are, for example, stamped-out portions. The front face 2 is thus partially formed by the film 12 being injection-moulded from the rear. As the film 12 is translucent and preferably has no absorption element and/or scattering element, less light is absorbed and/or scattered on the path to the translucent region 6. The film 12 is preferably inserted with the decorative element 5 into the injection-moulding tool and when the light-guiding layer 10 is injection-moulded from the rear, is plastically deformed together with the decorative element 5. The decorative element 5 thus has to be injection-moulded only once to the rear to form the light-guiding layer 10. In this case, by means of the injection-moulding pressure, the decorative element 5 is shaped on the corresponding tool part. The decorative element 5 injection-moulded from the rear is then placed according to FIG. 3 in the direction of the arrow 22 onto the housing 14 on which the illuminating element 9 are mounted. The component 1 is now ready for mounting and may be fastened to a part 23 according to FIG. 6. Optionally, the illuminating element 9 may be connected via cables, not shown here, to an electrical power source.

The invention claimed is:

1. An illuminable component having a visible face, an edge surrounding the visible face and a rear face comprising:
   a two-dimensionally extending decorative element produced from metal and having at least one translucent region and at least one non-translucent region,
   an illuminating element for illuminating the at least one translucent region, and
   at least one light-guiding layer arranged between the decorative element and the illuminating element, said layer being attached to a rear face of the decorative element and extending at least as far as the region of the edge,
   wherein in the light-guiding layer an element is provided which comprises at least one pigment being distributed homogeneously in the light-guiding layer and which substantially completely absorbs and/or scatters light when conveyed by the illuminating element to the aforementioned edge.

2. The component as claimed in claim 1, wherein the two-dimensionally extending decorative element extends at least partially into the edge.

3. The component as claimed in claim 1, wherein the rear face of the decorative element is at least partially configured to be light-absorbing and/or light-scattering.

4. The component as claimed in claim 3, wherein on the rear face of the decorative element an adhesive layer or a further layer is arranged and that said adhesive layer and/or further layer has at least partially the aforementioned element for light absorption and/or light scattering.

5. The component as claimed in claim 1, wherein between the decorative element and the light-guiding layer a transparent film is arranged which extends at least over the translucent region of the decorative element.

6. The component as claimed in claim 5, wherein the transparent film engages in at least one opening of the decorative element.

7. The component as claimed in claim 1, wherein the light-guiding layer is injection-moulded onto the rear face of the decorative element.

8. The component as claimed in claim 1, wherein the light-guiding layer extends substantially over the entire region of the rear face of the decorative element.

9. The component as claimed in claim 1, wherein the light-guiding layer forms a relatively narrow region of an edge outer face.

10. The component as claimed in claim 1, wherein the decorative element is a film shaped in an injection-moulding tool.

11. The component as claimed in claim 1, wherein it comprises a housing, which substantially forms the rear face of the component.

12. The component as claimed in claim 1, wherein it is provided for producing a sill strip, a decorative strip, an operating element or a pushbutton.

13. The component as claimed in claim 1, wherein the decorative element itself is configured to be light-absorbing and/or light-scattering.

14. The component as claimed in claim 13, wherein the decorative element has a light-absorbing and/or light-scattering element.

15. The component as claimed in claim 1, wherein the decorative element is multi-layered.

16. The component as claimed in claim 1, wherein the decorative element is produced from metal.

17. The component as claimed in claim 16, wherein the decorative element is a film or a sheet.

* * * * *